(12) United States Patent
Xavier et al.

(10) Patent No.: US 8,886,351 B2
(45) Date of Patent: Nov. 11, 2014

(54) MACHINE FOR ASSEMBLING VEHICLES AND METHODS OF ASSEMBLING VEHICLES

(75) Inventors: Joseph Xavier, Leeds, AL (US); Greg Camp, Anniston, AL (US); George Branch, Anniston, AL (US)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 13/314,947

(22) Filed: Dec. 8, 2011

(65) Prior Publication Data

US 2013/0150996 A1 Jun. 13, 2013

(51) Int. Cl.
*G06F 19/00* (2011.01)

(52) U.S. Cl.
USPC .......................................... 700/109; 700/117

(58) Field of Classification Search
USPC ......... 700/109, 108, 117, 98; 701/29.6, 1, 14, 701/36, 38; 446/448
See application file for complete search history.

(56) References Cited

U.S. PATENT DOCUMENTS

| | | | |
|---|---|---|---|
| 4,344,325 A | 8/1982 | Iwama | |
| 4,381,548 A | 4/1983 | Grossman et al. | |
| 4,569,140 A | 2/1986 | Hobson | |
| 4,815,190 A * | 3/1989 | Haba et al. | 29/430 |
| 4,942,659 A | 7/1990 | Sakurai | |
| 5,167,065 A * | 12/1992 | Koga | 29/824 |
| 5,812,256 A | 9/1998 | Chapin et al. | |
| 5,875,418 A | 2/1999 | Gill et al. | |
| 6,018,879 A | 2/2000 | Carder | |
| 6,301,763 B1 * | 10/2001 | Pryor | 29/407.04 |
| 6,684,516 B2 | 2/2004 | Voeller et al. | |
| 6,799,376 B1 | 10/2004 | Voeller et al. | |
| 7,408,464 B2 * | 8/2008 | Brodine | 340/572.1 |
| 7,864,309 B2 * | 1/2011 | De Sloovere et al. | 356/139.09 |
| 7,913,370 B2 * | 3/2011 | Savoy | 29/407.1 |
| 2005/0087593 A1* | 4/2005 | Benedict | 235/375 |

* cited by examiner

*Primary Examiner* — Kidest Bahta
(74) *Attorney, Agent, or Firm* — Armstrong Teasdale LLP

(57) ABSTRACT

A machine for use in assembling a vehicle is described herein. The vehicle includes at least a first component and a second component adapted to be coupled to the first component to form a component assembly. The machine includes at least one component tooling apparatus that is configured to selectively adjust an orientation of the second component with respect to the first component. A control system is coupled to the at least one component tooling apparatus. The control system includes a processor that is configured to receive a unique vehicle identifier associated with the component assembly, and determine a design orientation of the second component with respect to the first component based at least in part on the received unique vehicle identifier.

20 Claims, 6 Drawing Sheets

MACHINE FOR ASSEMBLING VEHICLES AND METHODS OF ASSEMBLING VEHICLES

BACKGROUND

The field of the disclosure relates generally to automobiles, and more specifically, to a machine for use in and methods of assembling vehicles.

At least some known vehicles include suspension systems that are coupled to a plurality of wheels to assist in steering and handling of the vehicle, and to reduce vibration during operation of the vehicle. Known suspension systems extend between a driver side and a passenger side of the vehicle. Each wheel is coupled to the suspension system at a predefined camber angle measured with respect to the vehicle. Known vehicles include a cross camber value that is equal to a difference of a left camber angle and a right camber angle.

Generally, the cross camber value of the vehicle may affect the steering and/or a direction a vehicle will travel. For example, a positive cross camber generally causes a vehicle to drift towards the driver side, while a negative cross camber generally causes the vehicle to drift towards the passenger side. Excessive drift towards the passenger and/or driver side adversely affects the overall vehicle steering, as such often manual adjustments must be made to each camber angle to adjust the cross camber value to reduce the vehicle drift.

At least some known suspension systems include a plurality of damper assemblies that are coupled to the wheels. Each damper assembly includes a wheel assembly, and a damper coupled to the wheel assembly. The wheel assembly is coupled to a corresponding wheel such that the camber angle is based at least in part on the orientation of the damper with respect to the wheel assembly. At least some known vehicles are assembled with a plurality of damper assemblies that each have substantially the same damper orientation. As such, any adjustments to the camber angle of each wheel are made after the vehicle has been assembled. However, such adjustments often require significant labor and equipment, and result in an increased cost to maintain the vehicle.

BRIEF DESCRIPTION

In one embodiment, a machine for use in assembling a vehicle is provided. The vehicle includes at least a first component and a second component adapted to be coupled to the first component to form a component assembly. The machine includes at least one component tooling apparatus that is configured to selectively adjust an orientation of the second component with respect to the first component. A control system is coupled to the at least one component tooling apparatus. The control system includes a processor that is configured to receive a unique vehicle identifier associated with the component assembly, and determine a design orientation of the second component with respect to the first component based at least in part on the received unique vehicle identifier. The processor is also configured to couple the second component to the first component such that the orientation of the second component with respect to the first component is substantially similar to the determined second component design orientation.

In another embodiment, an assembly management system for use in assembling a vehicle is provided. The vehicle includes at least a first component and a second component adapted to be coupled to the first component to form a component assembly. The assembly management system includes a component management device that is coupled with at least one component tooling apparatus, and that is configured to selectively adjust an orientation of the second component with respect to the first component. The component management device is configured to receive a unique vehicle identifier associated with the component assembly, and determine a design orientation of the second component with respect to the first component based at least in part on the received unique vehicle identifier. The component management device is also configured to couple the second component to the first component such that the orientation of the second component with respect to the first component is substantially similar to the determined second component orientation.

In yet another embodiment, a method of assembling a vehicle is provided. The method includes receiving, by an assembly machine, a request to assemble a component assembly, wherein the component assembly includes a first component, and a second component adapted to be coupled to the first component. A unique vehicle identifier associated with the component assembly is received, and a design orientation of the second component with respect to the first component is determined based at least in part on the received unique vehicle identifier. The second component is coupled to the first component such that the orientation of the second component with respect to the first component is substantially similar to the determined component design orientation.

The features, functions, and advantages that have been discussed can be achieved independently in various embodiments or may be combined in yet other embodiments, further details of which can be seen with reference to the following description and drawings.

DETAILED DESCRIPTION

Figure 1:
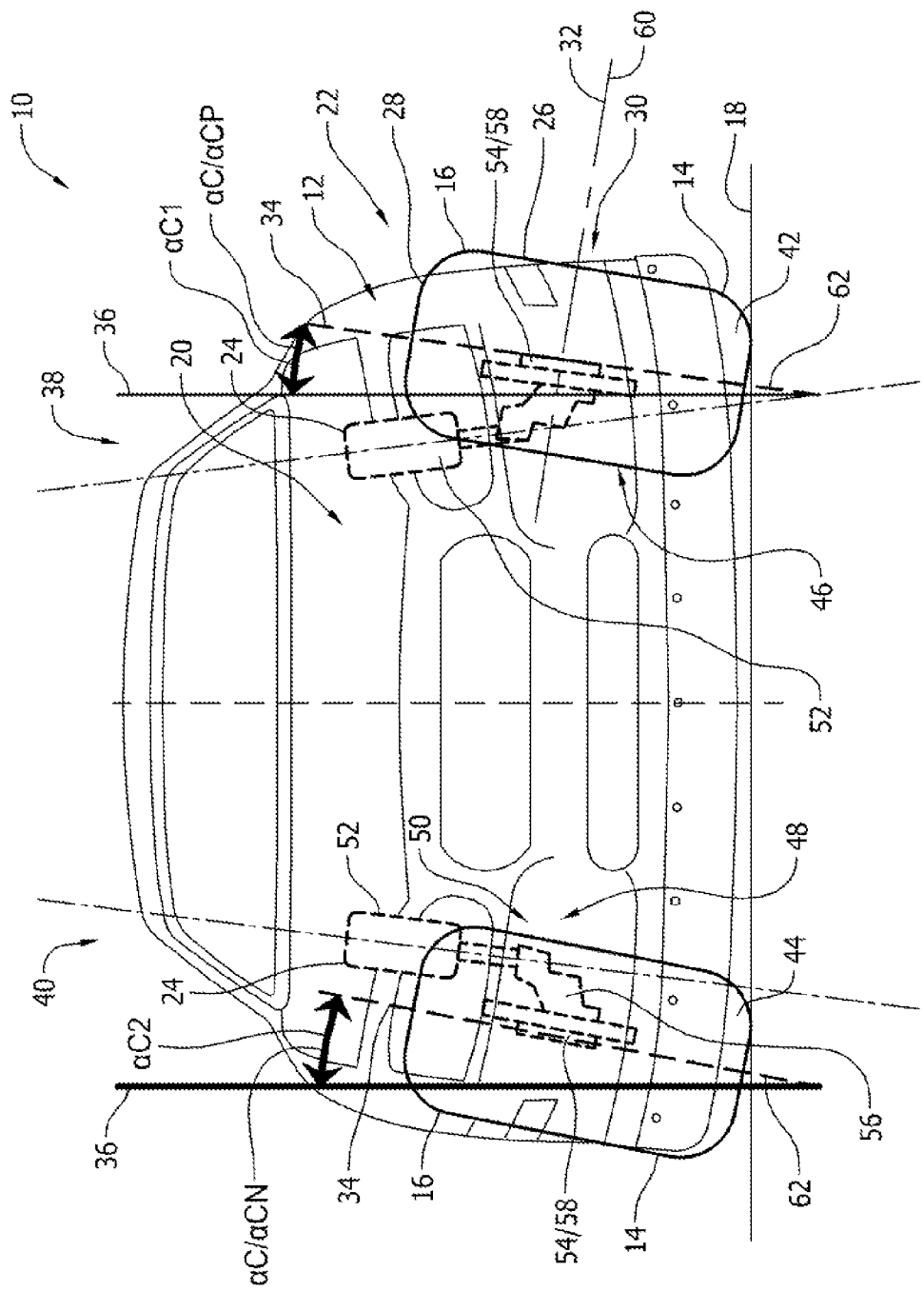
FIG. 1 is a schematic diagram of an exemplary vehicle including a damper assembly.

The methods and machine for use in assembling a vehicle described herein overcome at least some of the limitations of known vehicle manufacturing processes by providing a machine that may be used to assemble a plurality of component assemblies that have a plurality of different component orientations. More specifically, the machine described herein includes a component tooling apparatus that is configured to assemble a damper assembly including a wheel assembly and a damper, and that selectively adjusts an orientation of the damper with respect to the wheel assembly, such that a damper angle of the damper assembly is adjusted. By assembling component assemblies with various component orientations, a cross camber value of a vehicle may be adjusted during assembly of the vehicle, thus reducing the cost of selectively adjusting the cross camber value after production of the vehicle.

The machine also includes a control system that is coupled to the component tooling apparatus to enable an operator to program different component orientations into the control system to facilitate forming various component assemblies that include various component orientations. In addition, the control system is configured to determine a component orientation based at least in part on vehicle characteristics and/or tire characteristics. By determining a component orientation based on various vehicle and/or tire characteristics, component assemblies with different types of component orientations can be continuously assembled using the machine without having to stop the machine for adjustment or reconfiguration between different configurations. Thus, the cost of forming different types of component assemblies is reduced as compared to known component forming machines.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

A controller, control system, computing device, or computer, such as described herein, includes at least one or more processors or processing units and a system memory. The controller typically also includes at least some form of computer readable media. By way of example and not limitation, computer readable media may include tangible computer storage media. Computer storage media may include volatile and nonvolatile, removable and non-removable media implemented in any method or technology that enables storage of information, such as computer readable instructions, data structures, program modules, or other data. Computer storage media typically embody computer readable instructions, data structures, program modules, or other data.

Although described in connection with an exemplary manufacturing system environment, embodiments described herein are operational with numerous other general purpose or special purpose computing system environments or configurations. The system environment is not intended to suggest any limitation as to the scope of use or functionality of any aspect of the subject matter described herein. Moreover, the system environment should not be interpreted as having any dependency or requirement relating to any one or combination of components illustrated in the exemplary operating environment. Examples of well known systems, environments, and/or configurations that may be suitable for use with the embodiments described herein include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in the embodiments described herein is not essential, unless otherwise specified. That is, the operations described herein may be performed in any order, unless otherwise specified, and embodiments may include additional or fewer operations than those disclosed herein. For example, it is contemplated that executing or performing a particular operation before, contemporaneously with, or after another operation is within the scope of aspects of the embodiments.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a memory device, as described herein, includes a computer readable medium, such as, without limitation, random access memory (RAM), flash memory, a hard disk drive, a solid state drive, a diskette, a flash drive, a compact disc, a digital video disc, and/or any suitable device that enables a processor to store, retrieve, and/or execute instructions and/or data.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enable the systems and methods to operate as described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, the technical effect of the methods, systems, and computers described herein includes at least one of (a) receiving, by an assembly machine, a request to assemble a component assembly; (b) receiving, from a facility control system, a unique vehicle identifier associated with the vehicle component assembly; (c) determining a design orientation of a second component with respect to a first component based at least in part on the received unique vehicle identifier; and (d) coupling the second component to the first component to form the component assembly such that the orientation of the second component with respect to the first component is substantially similar to the determined component design orientation.

FIG. 1 is a schematic diagram of an exemplary vehicle 10 such as, for example an automobile. In the exemplary embodiment, vehicle 10 includes at least one wheel suspension system 12 that is coupled to a plurality of wheels 14. Each wheel 14 includes a tire 16 that supports vehicle 10 from a supporting surface 18 and that enables vehicle 10 to travel along supporting surface 18. In the exemplary embodiment, vehicle 10 includes a first suspension system, i.e. a front suspension system 20, and a second suspension system, i.e. a rear suspension system (not shown), that are each coupled to a vehicle support frame (not shown). Each suspension system 12 is coupled to a pair 22 of wheels 14 and to the vehicle support frame to at least partially support vehicle 10 from wheels 14. Each suspension system 12 includes a plurality of damper assemblies 24 that are coupled to each wheel 14 to reduce vibrations induced to vehicle 10 during operation of vehicle 10. Each wheel 14 includes a radially inner surface 26 and a radially outer surface 28. Radially inner surface 26 defines a substantially cylindrical opening 30 that extends along a centerline axis 32. Radially outer surface 28 is spaced radially outwardly from inner surface 26 along a wheel radial axis 34 that is substantially perpendicular to wheel centerline axis 32. Wheel 14 is coupled to vehicle 10 such that a camber angle $\alpha_C$ is defined between wheel radial axis 34 and a vertical axis 36 that is substantially perpendicular to supporting surface 18. In one embodiment, wheel 14 may be oriented at a positive camber angle $\alpha_{CP}$ such that wheel outer surface 28 is oriented away from vehicle 10. In addition, wheel 14 may be oriented at a negative camber angle $\alpha_{CN}$ such that wheel outer surface 28 is oriented towards vehicle 10.

In the exemplary embodiment, each suspension system 12 extends between a first side, i.e. a driver side 38, and a second side, i.e. a passenger side 40. Vehicle 10 includes a first wheel 42 that is coupled to driver side 38, and a second wheel 44 that is coupled to passenger side 40. First wheel 42 is oriented at a first camber angle $\alpha_{C1}$, and second wheel 44 is oriented at a second camber angle $\alpha_{C2}$. In one embodiment first camber angle $\alpha_{C1}$ is approximately equal to second camber angle $\alpha_{C2}$. Alternatively, first camber angle $\alpha_{C1}$ is different than second camber angle $\alpha_{C2}$. Vehicle 10 includes a cross camber value that is equal to the sum of first camber angle $\alpha_{C1}$ and second camber angle $\alpha_{C2}$, wherein a positive cross camber value may cause vehicle 10 to pull towards driver side 38, and a negative cross camber value may cause vehicle 10 to pull towards passenger side 40.

In the exemplary embodiment, suspension system 12 includes a first damper assembly 46 and a second damper assembly 48. First damper assembly 46 is coupled to first wheel 42 such that first wheel 42 is oriented at first camber angle $\alpha_{C1}$. Second damper assembly 48 is coupled to second wheel 44 such that second wheel 44 is oriented at second camber angle $\alpha_{C2}$. In the exemplary embodiment, each damper assembly 24 includes a wheel assembly 50, and a damper 52 that is coupled to wheel assembly 50. Wheel assembly 50 includes a wheel disk 54, and a support member 56 that is coupled to wheel disk 54. Wheel disk 54 includes a disk body 58 that extends axially along a disk centerline axis 60, and extends radially along a disk radial axis 62 that is substantially perpendicular to disk centerline axis 60. Wheel disk 54 is adapted to be coupled to wheel 14 such that disk centerline axis 60 is oriented substantially coaxially with wheel centerline axis 32, and such that disk radial axis 62 is oriented substantially parallel to wheel radial axis 34. Support member 56 includes a first end 64 (shown in FIG. 3) and a second end 66 (shown in FIG. 3). First end 64 is coupled to wheel disk 54, and second end 66 is coupled to damper 52. Support member 56 extends outwardly from wheel disk 54 along disk centerline axis 60, and has a length 68 defined between first and second ends 64 and 66 and measured along disk centerline axis 60. Damper 52 extends outwardly from wheel assembly 50 and is pivotably coupled to support member 56 at a pivot point 70 (shown in FIG. 3). Damper 52 is coupled to support member 56 with a pair 72 of fasteners 74 (shown in FIG. 3) such as, for example bolts, screws, pins, and/or any other suitable fastener. In the exemplary embodiment, during assembly of damper assembly 24, fasteners 74 are oriented to enable damper 52 to pivot with respect to wheel assembly 50 about pivot point 70 to adjust an orientation of damper 52 with respect to wheel assembly 50. Fasteners 74 are then tightened and/or welded to damper 52 and support member 56 to securely couple damper 52 to wheel assembly 50.

Figure 3:
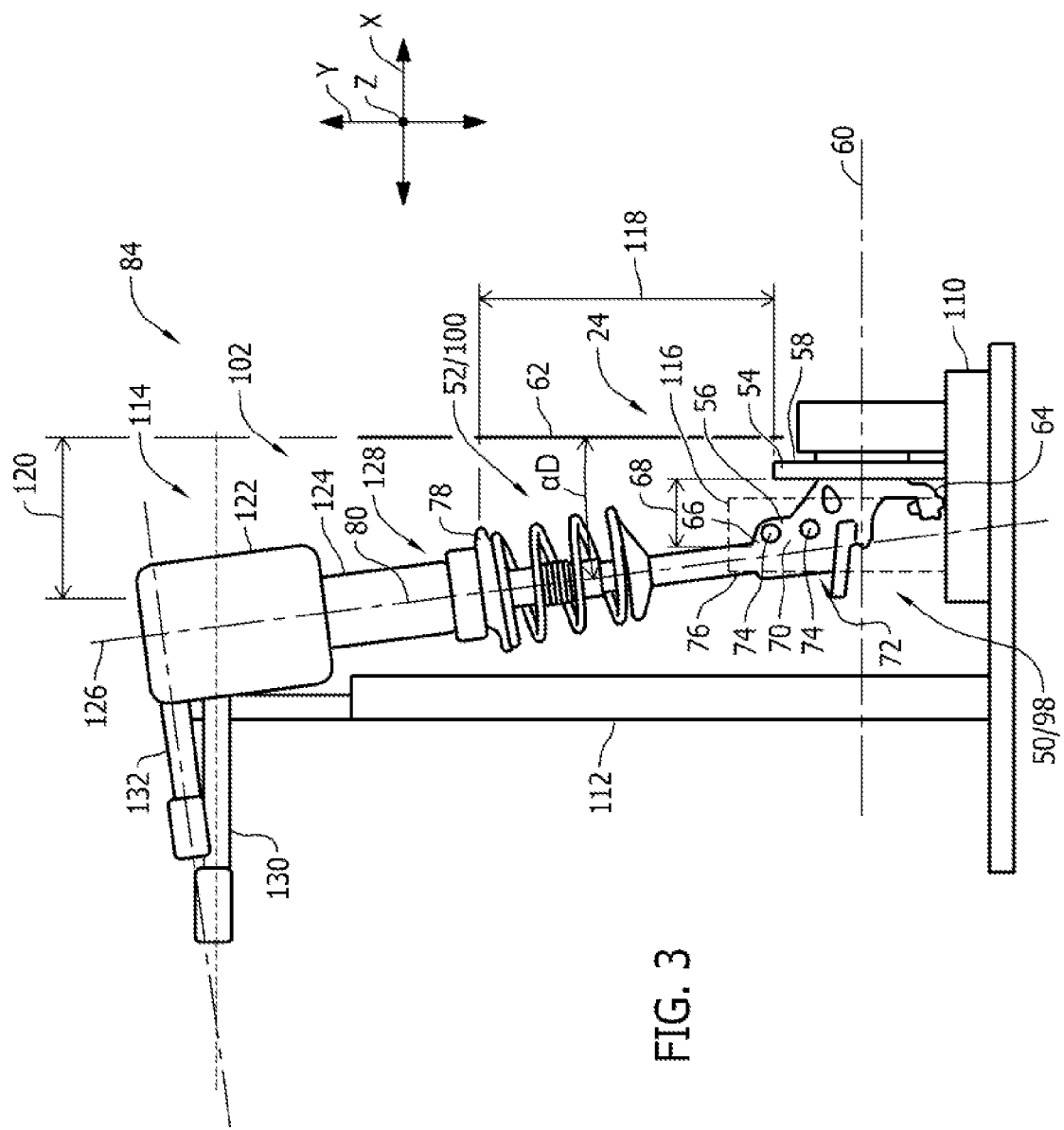
FIG. 3 is a schematic view of an exemplary machine that may be used to assemble the damper assembly shown in FIG. 1.

Damper 52 extends between a first end 76 (shown in FIG. 3) and a second end 78 (shown in FIG. 3). First end 76 is coupled to support member 56. Second end 78 extends outwardly from first end 76 along a longitudinal axis 80, and is coupled to the vehicle support frame. In the exemplary embodiment, damper 52 extends outwardly from wheel assembly 50 such that a damper angle $\alpha_D$ (shown in FIG. 3) is defined between damper 52 and wheel assembly 50. Damper angle $\alpha_D$ is measured between damper axis 80 and disk radial axis 62. In the exemplary embodiment, damper angle $\alpha_D$ at least partially defines camber angle $\alpha_C$ such that an adjustment of damper angle $\alpha_D$ also adjusts a corresponding camber angle $\alpha_C$.

Figure 2:
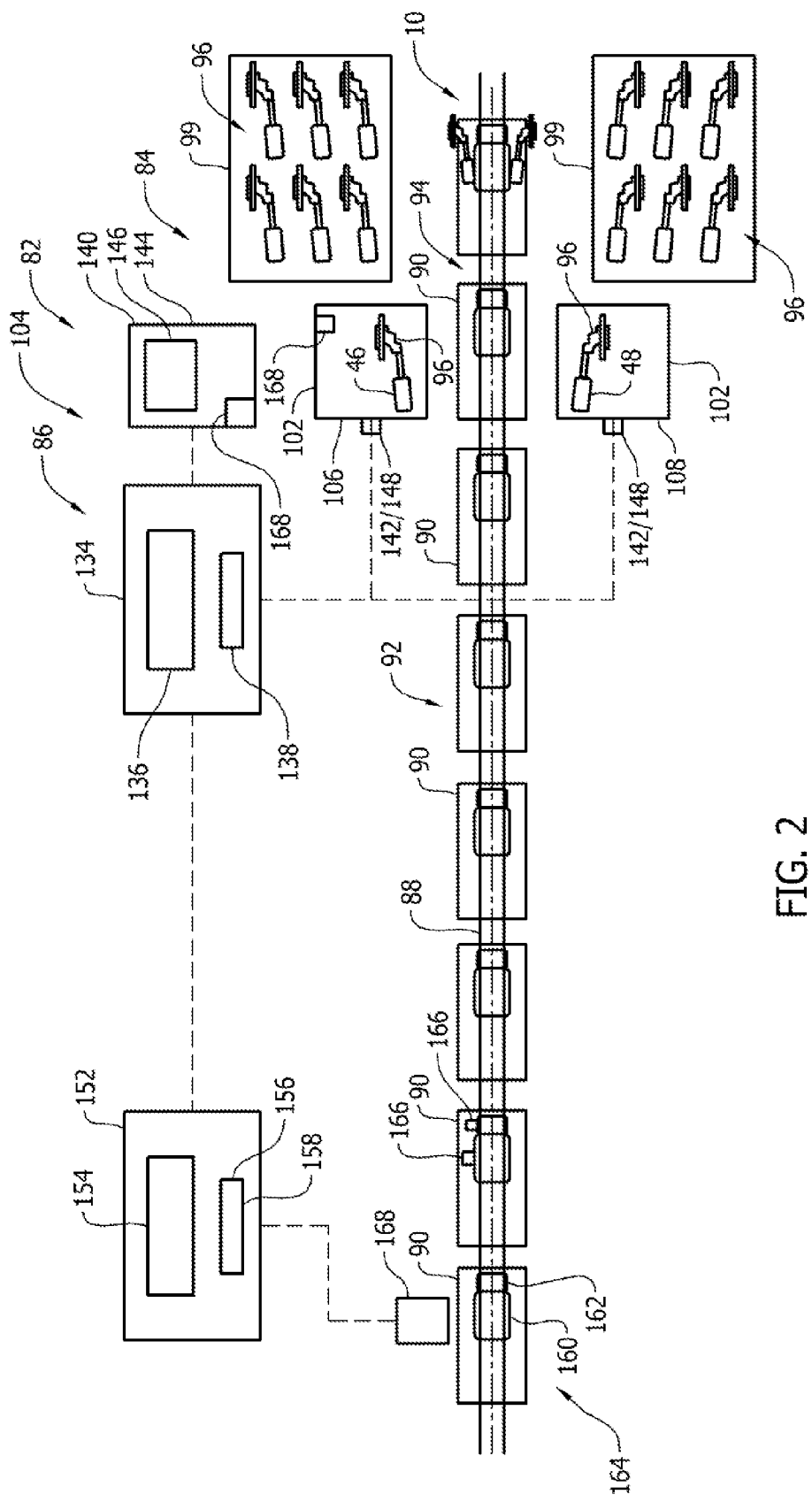
FIG. 2 is a schematic diagram of an exemplary manufacturing process for use in manufacturing the vehicle shown in FIG. 1.
Figure 4:
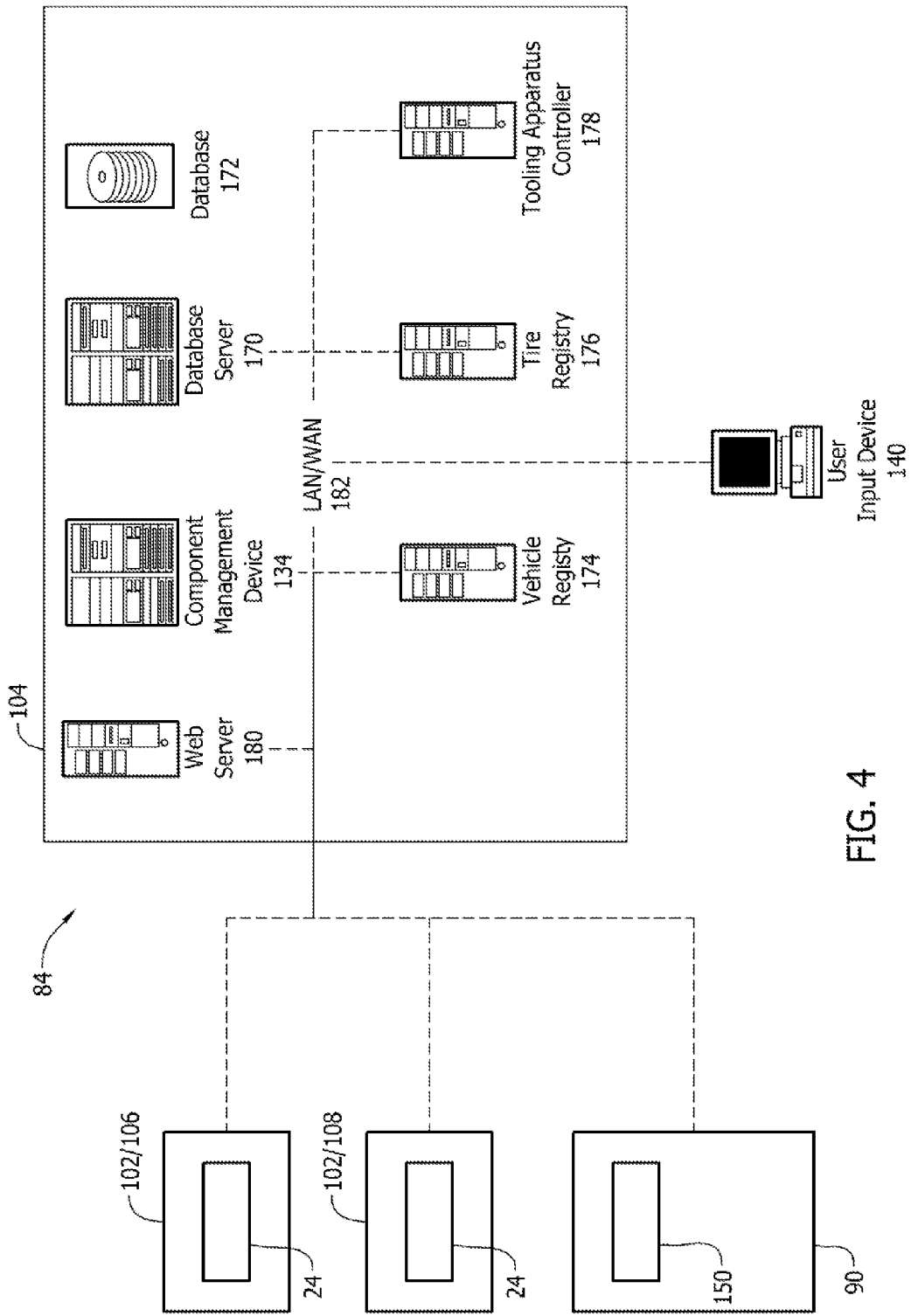
FIG. 4 is a block diagram of an exemplary control system that may be used with the manufacturing process shown in FIG. 2.

FIG. 2 is a schematic diagram of an exemplary manufacturing process 82 for manufacturing vehicle 10. FIG. 3 is a schematic view of an exemplary machine 84 that may be used to assemble vehicle 10. FIG. 4 is a block diagram of an exemplary control system 86 that may be used with manufacturing process 82. Identical components shown in FIGS. 2-4 are identified using the same reference numbers used in FIG. 1. In the exemplary embodiment, a conveyance system 88 continuously conveys a plurality of vehicle assemblies 90 towards machine 84 in an assembly line 92. Each vehicle assembly 90 is conveyed to an assembly area 94 that is adjacent to machine 84 to enable machine 84 to couple one or more component assemblies 96 onto vehicle assembly 90. Machine 84 receives a plurality of component assemblies 96 from a supply area 99, assembles each component assembly 96, and couples each assembled component assembly 96 to vehicle assembly 90 to at least partially assemble vehicle 10. In one embodiment, a user conveys each component assembly 96 to machine 84 from supply area 99, and the user operates machine 84 to assemble each component assembly 96. The user then conveys the assembled component assembly 96 to vehicle assembly 90 and couples the assembled component assembly 96 to vehicle 10.

In the exemplary embodiment, component assembly 96 is a damper assembly 24, and includes at least a first component 98, i.e. a wheel assembly 50, and a second component 100, i.e. a damper 52, that is adapted to be coupled to first component 98. Machine 84 receives first component 98 and second component 100 from supply area 99, selectively adjusts an orientation of second component 100 with respect to first component 98, and couples second component 100 to first component 98 to form component assembly 96 such that second component 100 is oriented at a predefined orientation with respect to first component 98.

Machine 84 can be used to assemble a variety of damper assemblies 24. In addition, machine 84 can continuously form multiple different types of damper assemblies 24 without requiring any reconfiguration of machine 84. In other words, different types of damper assemblies 24 (i.e., damper assemblies having a different damper angle and/or different support member length) can assembled on machine 84 without requiring machine 84 to stop operation and without reconfiguring and/or manually adjusting machine 84.

In the exemplary embodiment as shown in FIG. 2, machine 84 includes a component tooling apparatus 102, and control system 86, i.e. an assembly management system 104, that is coupled to component tooling apparatus 102. Moreover, machine 84 includes a first component tooling apparatus 106 that assembles first damper assembly 46, and a second component tooling apparatus 108 that assemble second damper assembly 48.

In the exemplary embodiment, assembly management system 104 determines a design orientation such as, for example, a damper angle $\alpha_D$, of second component 100 with respect to first component 98 based at least in part on a plurality of vehicle characteristic associated with vehicle 10. In addition, assembly management system 104 operates component tooling apparatus 102 to couple second component 100 to first component 98 such that second component 100 is oriented at an orientation that is substantially similar to the determined design orientation. In the exemplary embodiment, vehicle characteristics include, but are not limited to only including, a vehicle model, a vehicle grade, and/or any other characteristics associated with vehicle 10 that enable machine 84 to function as described herein. As used herein, the term "vehicle model" refers to a type of vehicle such as, for example, a Honda Odyssey, or a Honda Ridgeline, commercially available from Honda Motor Co., Ltd, Tokyo, Japan. As used herein, the term "vehicle grade" refers to a size of a vehicle model, and/or a predefined collection of vehicle options such as, for example, interior design, exterior design, engine type, and/or transmission type, that is associated with a vehicle model.

In addition, assembly management system 104 determines the design component orientation based at least in part on a plurality of tire specifications associated with a tire 16 that is to be coupled to vehicle assembly 90 to form vehicle 10. Assembly management system 104 also couples second component 100 to first component 98 such that second component 100 is oriented at an orientation that is substantially similar to the determined design orientation. Tire characteristics include, but are not limited to only including, size, manufacturer, type, tread and/or any other characteristic associated with tire 16 that enables machine 84 to function as described herein.

In the exemplary embodiment, each component tooling apparatus 102 includes a base 110, a support assembly 112 that extends outwardly from base 110, a damper adjustment assembly 114 that is coupled to support assembly 112, and a bolt fastening device 116 that is coupled to base 110. Damper assembly 24 is loaded onto component tooling apparatus 102 such that wheel assembly 50 is supported from base 110. Damper adjustment assembly 114 engages damper 52 and to moves damper 52 with respect to wheel assembly 50 to adjust a damper angle $\alpha_D$ of damper assembly 24. Bolt fastening device 116 receives fasteners 74 and tightens fasteners 74 to securely couple damper 52 to wheel assembly 50 after damper assembly 24 has adjusted the damper angle $\alpha_D$.

In the exemplary embodiment, three perpendicular axes X, Y, and Z extend through component tooling apparatus 102, and are used to define a three-dimensional Cartesian coordinate system relative to component tooling apparatus 102. Specifically, the Y-axis is oriented to extend substantially parallel with disk radial axis 62, the X-axis is oriented to extend substantially perpendicular to the Y-axis and substantially parallel with disk centerline axis 60, and the Z-axis is oriented substantially perpendicular to the X-axis and the Y axis. Damper adjustment assembly 114 is coupled to support assembly 112 such that damper adjustment assembly 114 is spaced a first distance 118 from wheel assembly 50 measured along the Y-axis, and spaced a second distance 120 from wheel assembly 50 measured along the X-axis such that damper assembly 24 is positioned between base 110 and damper adjustment assembly 114.

In the exemplary embodiment, damper adjustment assembly 114 includes a positioning assembly 122 and an engagement arm 124 that extends outwardly from positioning assembly 122 along a centerline axis 126. Positioning assembly 122 is coupled to support assembly 112 such that positioning assembly 122 is movable with respect to damper assembly 24. In addition, positioning assembly 122 is oriented substantially coaxially with respect to damper 52 to enable damper adjustment assembly 114 to contact damper 52 and move damper 52 about pivot point 70 to adjust a damper angle $\alpha_D$ of damper assembly 24. Engagement arm 124 is slideably coupled to positioning assembly 122 such that engagement arm 124 is movable along centerline axis 126. In the exemplary embodiment, positioning assembly 122 selectively moves engagement arm 124 along arm axis 126 between a first position 128, wherein engagement arm 124 extends outwardly from positioning assembly to receive damper second end 78 to enable damper adjustment assembly 114 to adjust damper angle $\alpha_D$, and a second position (not shown), wherein engagement arm 124 is retracted away from damper 52 and toward positioning assembly 122 to enable damper assembly 24 to be loaded and unloaded from component tooling apparatus 102. In one embodiment, positioning assembly 122 includes a pneumatic actuator. Alternatively, positioning assembly 122 may include a ball-screw type actuator, hydraulic piston-type cylinders, and/or any suitable device that enables component tooling apparatus 102 to function as described herein.

In the exemplary embodiment, damper adjustment assembly 114 also includes a first positioning device 130, and a second positioning device 132. Each first positioning device 130 and second positioning device 132 moves positioning assembly 122 with respect to damper assembly 24 to enable damper adjustment assembly 114 to adjust a damper angle $\alpha_D$ of damper assembly 24. More specifically, first positioning device 130 is coupled to support assembly 112 and to positioning assembly 122, and selectively moves positioning assembly 122 along the X-axis. Second positioning device 132 is coupled to support assembly 112 and positioning assembly 122, and selectively pivots positioning assembly 122 about pivot point 70. In the exemplary embodiment, each first positioning device 130 and second positioning device 132 includes a ball-screw type actuator. Alternatively, first and second positioning devices 130 and 132 may include pneumatic cylinders, electric motors, hydraulic piston-type cylinders, and/or any suitable device that enables component tooling apparatus 102 to function as described herein.

During operation, a damper assembly 24 is loaded onto component tooling apparatus 102. First positioning device 130 moves positioning assembly 122 along the X-axis such that positioning assembly 122 is oriented coaxially with damper axis 80. Positioning assembly 122 extends engagement arm 124 to receive damper 52 within engagement arm 124, and second positioning device 132 moves positioning assembly 122 to pivot positioning assembly 122 and damper 52 about pivot point 70 such that damper angle $\alpha_D$ is approximately equal to a predefined damper angle. After damper 52 has been adjusted to the predefined damper angle, bolt fastening device 116 engages fasteners 74, and tightens fasteners 74 to securely couple damper 52 to wheel assembly 50.

In the exemplary embodiment, assembly management system 104 includes a component management device 134 that includes a processor 136, a memory device 138 coupled to processor 136, a user input device 140 coupled to processor 136, and a plurality of sensors 142 that are coupled to processor 136. Component management device 134 is coupled in operative communication with each component tooling apparatus 102 to selectively operate each component tooling apparatus 102 to assemble each damper assembly 24 that is associated with each vehicle assembly 90 conveyed along assembly line 92.

User input device 140 enables a user to access assembly management system 104, and request information associated with machine 84, damper assembly 24, vehicle 10, vehicle assembly, and/or component tooling apparatus 102. In addition, user input device 140 enables a user to initiate an operation of component tooling apparatus 102 to assemble a damper assembly 24. In the exemplary embodiment, user input device 140 includes a display 144 and a user interface 146. Display 144, in the exemplary embodiment, includes a vacuum fluorescent display (VFD) and/or one or more light-emitting diodes (LED). Additionally or alternatively, display 144 may include, without limitation, a liquid crystal display (LCD), a cathode ray tube (CRT), a plasma display, and/or any suitable visual output device capable of displaying graphical data and/or text to the user. In an exemplary embodiment, an assembly request, a vehicle characteristic, a tire characteristic, and/or any other information may be displayed to the user on display 144. User interface 146 includes, without limitation, a keyboard, a keypad, a touch-sensitive screen, a scroll wheel, a pointing device, a barcode reader, a magnetic card reader, a radio frequency identification (RFID) reader, an audio input device employing speech-recognition software, and/or any suitable device that enables the user to input data into processor 136 and/or to retrieve data from processor 136. In one embodiment, user interface 146 is integrated with display 144 such that user interface 146 is accessed by the user via display 144.

Each sensor 142 senses various parameters relative to the operation of conveyance system 88, machine 84, and/or component tooling apparatus 102. Sensors 142 may include, but are not limited to only including, position sensors, RFID sensors, speed sensors, and/or any other sensors that sense various parameters relative to the condition of conveyance system 88, machine 84, and/or component tooling apparatus 102. As used herein, the term "parameters" refers to physical properties whose values can be used to define the operating conditions of conveyance system 88, machine 84, and/or component tooling apparatus 102, such as a position of vehicle assembly 90 along assembly line 92 and/or a position of damper assembly 24 within component tooling apparatus 102. In the exemplary embodiment, assembly management system 104 includes a plurality of position sensors 148 that are coupled to each component tooling apparatus 102 for sensing a position of damper assembly 24 with respect to component tooling apparatus 102, and transmitting a signal indicative of the sensed position to processor 136. In addition, position sensors 148 sense a position of positioning assembly 122, and transmit the sensed position to component management device 134 to enable component management device 134 to determine a position and/or orientation of positioning assembly 122 with respect to damper assembly 24.

In the exemplary embodiment, each vehicle assembly 90 includes a unique vehicle identifier 150 that is used by assembly management system 104 to identify vehicle assembly 90 to determine a component assembly 96 associated with the identified vehicle assembly 90. More specifically, assembly management system 104 uses unique vehicle identifier 150 to determine a design orientation of second component 100 with respect to first component 98 to assemble component assembly 96.

In the exemplary embodiment, assembly management system 104 is coupled to a facility control system 152. Facility control system 152 includes a processor 154 that is coupled to a database 156. Database 156 includes a vehicle assembly program 158 that includes a collection of unique vehicle identifiers 150 that are associated with each vehicle assembly 90 that is included in assembly line 92. Vehicle assembly program 158 also includes a sequential order in which vehicle assemblies 90 are being conveyed to machine 84, such that facility control system 152 may identify the unique vehicle identifier 150 associated with a vehicle assembly 90 positioned in assembly area 94.

In one embodiment, each vehicle assembly 90 includes a motor 160 and a transmission 162 that is coupled to motor 160. Transmission 162 is coupled to motor 160 in an engine area 164 that is upstream of assembly area 94 along assembly line 92. Facility control system 152 assigns a unique vehicle identifier 150 to vehicle assembly 90 after transmission 162 has been coupled to motor 160 to form vehicle assembly 90. For example, in one embodiment, transmission 162 includes a bar code that includes a unique transmission identifier, and motor 160 includes a bar code that includes a unique motor identifier. Facility control system 152 includes a user input device 140 to enable a user to scan the transmission bar code and the motor bar code. More specifically, the user couples transmission 162 to motor 160, scans the transmission bar code and the motor bar code, and transmits a signal indicative of the unique motor identifier and the unique transmission identifier to facility control system 152. Facility control system 152 assigns a unique vehicle identifier 150 to the assembled vehicle assembly 90 based at least in part on the received transmission and motor identifiers. In another embodiment, each vehicle component, i.e. a transmission, a motor, damper 52, and/or wheel assembly 50 includes a radio frequency identification (RFID) device 166 that transmits an RFID signal indicative of an associated unique identifier. Each user input device 140 and/or each component tooling apparatus 102 includes an RFID receiver 168 that receives the unique identifiers and transmits a signal indicative of the sensed unique identifiers to facility control system 152 and/or component management device 134. Facility control system and/or assembly management system 104 are determines the unique vehicle identifier associated with the received component identifiers.

Various connections are available between component management device 134, sensors 142, facility control system 152 and/or component tooling apparatus 102. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible assembly management system 104) network connection, whether wired or wireless.

In the exemplary embodiment, facility control system 152 determines a sequential order of vehicle assemblies 90 to be conveyed to machine 84 and transmits a notification message to assembly management system 104 that includes a list of unique vehicle identifies 150 associated with the sequenced order of vehicle assemblies 90. A user loads a component assembly 96 onto component tooling apparatus 102, and accesses user input device 140 to initiate an operation of component tooling apparatus 102. Assembly management system 104 determines the unique vehicle identifier 150 associated with a vehicle assembly 90 positioned within assembly area 94 based at least in part on the sequenced vehicle assembly listing, and transmits a vehicle verification request to facility control system 152 including a request to verify the unique vehicle identifier 150. Facility control system 152 compares the received unique vehicle identifier with the vehicle assembly program 158 to determine if the received identifier is associated with the vehicle assembly 90 positioned within assembly area 94, and transmits a verification message to assembly management system 104 including a verified unique vehicle identifier 150 associated with the vehicle assembly 90 positioned within assembly area 94.

In the exemplary embodiment, assembly management system 104 determines a design orientation of second component 100 with respect to first component 98 based at least in part on the received verified unique vehicle identifier 150. Assembly management system 104 operates component tooling apparatus 102 to adjust an orientation of second component 100 with respect to first component 98, and to couple second component 100 to first component 98 such that the orientation of second component 100 with respect to first component 98 is substantially similar to the determined design orientation. In one embodiment, assembly management system 104 initiates an operation of component tooling apparatus 102 upon sensing a vehicle assembly 90 within assembly area 94. Alternatively, assembly management system 104 initiates an operation of component tooling apparatus 102 upon sensing a component assembly 96 within component tooling apparatus 102.

In the exemplary embodiment, assembly management system 104 also includes a database server 170, a database 172, a vehicle registry device 174, a tire registry device 176, a tooling apparatus controller 178, and a web server 180. User input device 140, databases 172 and 156, devices 134, 174, and 176, controller 178, and servers 170 and 180 are coupled in a communications network 182, such as the Internet and/or an intranet, and are interconnected through many interfaces including a network, such as a local area network (LAN), a wide area network (WAN), dial-in-connections, cable modems, wireless modems, and/or special high-speed Integrated Services Digital Network (ISDN) lines. Tooling apparatus controller 178 is coupled to each component tooling apparatus 102 to enable component management device 134 and/or a user to control an operation of component tooling apparatus 102. In one embodiment, a user may access assembly management system 104 via web server 180 to access tooling apparatus controller 178, vehicle registry device 174, and/or tire registry device 176 to update and/or change vehicle characteristics and/or tire characteristics associated with unique vehicle identifiers, and control an operation of component tooling apparatus 102.

Database server 170 is connected to database 172 that contains information on a variety of matters such as, for example, assembly status information related to vehicle assembly 90, vehicle assembly program 158, cross camber values associated with vehicle 10, camber angles associated with vehicle 10, unique vehicle identifiers 150 associated with each vehicle assembly 90, tire characteristics, vehicle characteristics, and damper angles associated with each vehicle characteristic, tire characteristic, and/or camber angle. Assembly status of vehicle assembly 90 may include, but is not limited to including, a position of vehicle assembly 90 along assembly line 92, a position of vehicle assembly with respect to machine 84, estimated time of arrival at assembly area 94, and/or any information related to the assembly of vehicle assembly 90. Vehicle characteristics include, but are not limited to only including, a vehicle model, a vehicle grade, and/or any other characteristics associated with vehicle 10. Tire characteristics include, but are not limited to only including, size, manufacturer, type, tread and/or any other characteristic associated with tire 16.

Vehicle registry device 174 is coupled to database 172 and includes a collection of unique vehicle identifiers 150 and a collection of vehicle characteristics that are each associated with a unique vehicle identifier 150. In addition, tire registry device 176 is coupled to database 172 and includes a collection of unique vehicle identifiers 150 and a collection of tire characteristics that are each associated with a unique vehicle identifier 150.

In the exemplary embodiment, component management device 134 receives a request to assemble a damper assembly 24 including a verified unique vehicle identifier 150. Component management device 134 transmits a vehicle characteristics request including verified unique vehicle identifier 150 to vehicle registry device 174. Vehicle registry device 174 determines a vehicle characteristic associated with the received unique vehicle identifier 150, and transmits a verification message to component management device 134 including the determined vehicle characteristics associated with the unique vehicle identifier 150. Component management device 134 operates component tooling apparatus 102 to adjust a position of damper 52 with respect to wheel assembly 50 to adjust a damper angle $\alpha_D$ based at least in part on the determined vehicle characteristics. Moreover, component management device 134 determines a damper angle $\alpha_D$ associated with the determined vehicle characteristics, and adjusts a position of damper 52 with respect to wheel assembly 50 such that damper angle $\alpha_D$ is approximately equal to the determined damper angle.

In addition, component management device 134 transmits a tire characteristics request to tire registry device 176 including verified unique vehicle identifier 150 and/or the determined vehicle characteristics. Tire registry device 176 determines a tire characteristics associated with unique vehicle identifier 150 and transmits a verification message including the determined tire characteristics to component management device 134. In one embodiment, tire registry device 176 determines a tire characteristics based at least in part on the determined vehicle characteristics. Component management device 134 determines a damper angle associated with the determined tire characteristics, adjusts a position of damper 52 based at least in part on the determined damper angle, and couples damper 52 to wheel assembly 50 such that damper angle $\alpha_D$ is approximately equal to the determined damper angle.

In one embodiment, component management device 134 determines a cross camber value of vehicle 10 based at least in part on the determined vehicle characteristics and/or determined tire characteristics. In addition, component management device 134 calculates a driver side camber angle and a passenger side camber angle based at least in part on the determined cross camber value. Component management device 134 also determines a first damper angle associated with the calculated driver side camber angle, and determines a second damper angle that is associated with the calculated passenger side camber angle. In addition, component management device 134 operates first component tooling apparatus 106 to adjust a damper angle of first damper assembly 46 based at least in part on the calculated first damper angle, and operates second component tooling apparatus 102 to adjust a damper angle of second damper assembly 48 based at least in part on the calculated second damper angle such that vehicle 10 includes a cross camber angle that is approximately equal to the determined cross camber value.

In the exemplary embodiment, component management device 134 also determines a support member length 68 based at least on part on unique vehicle identifier 150 and/or vehicle characteristics, and moves positioning assembly 122 to enable component assembly 96 to be loaded onto component tooling apparatus 106, and to enable positioning assembly 122 to engage damper 52.

Figure 5:
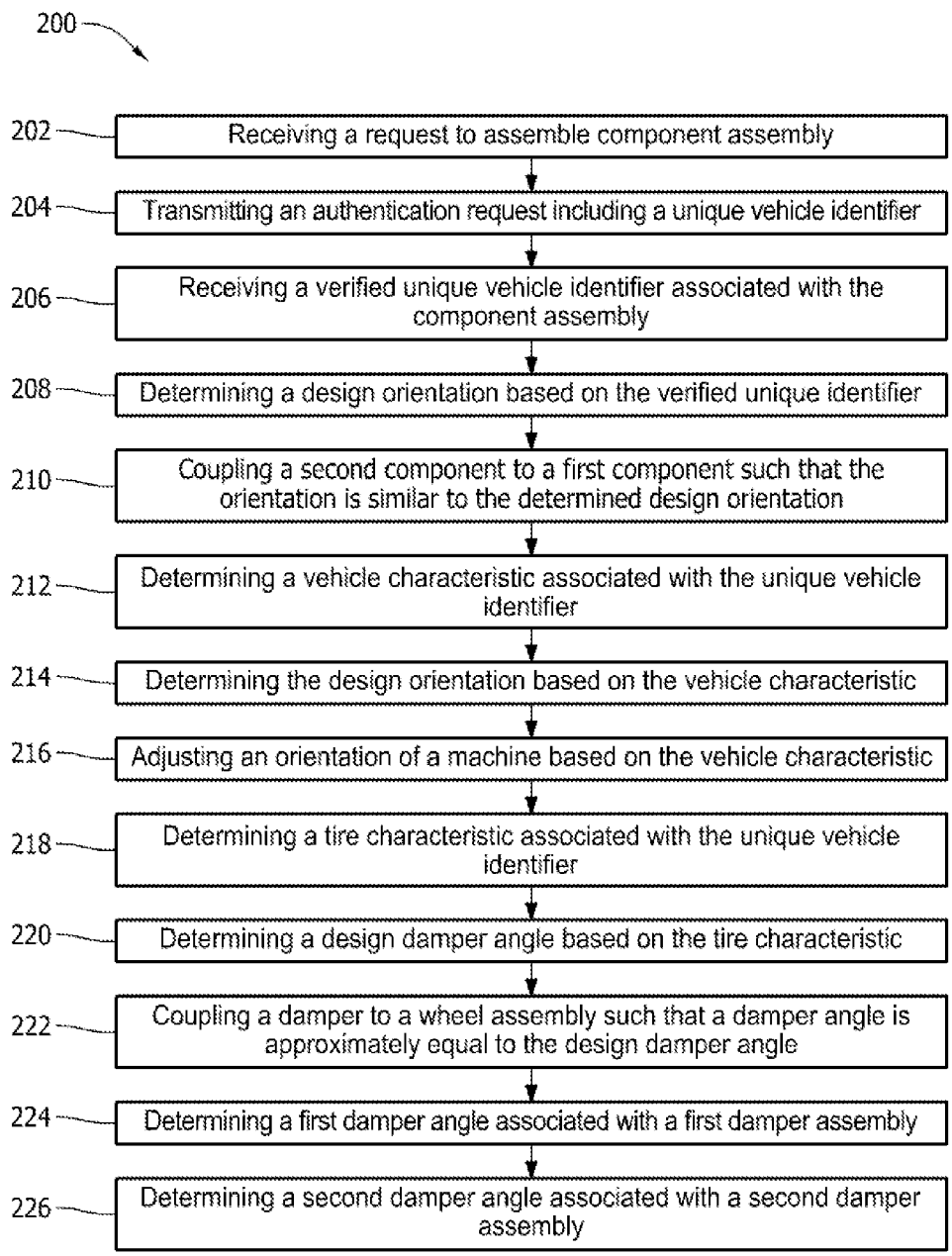
FIG. 5 is a flow chart of an exemplary method that may be used in assembling the vehicle shown in FIG. 1.
Figure 6:
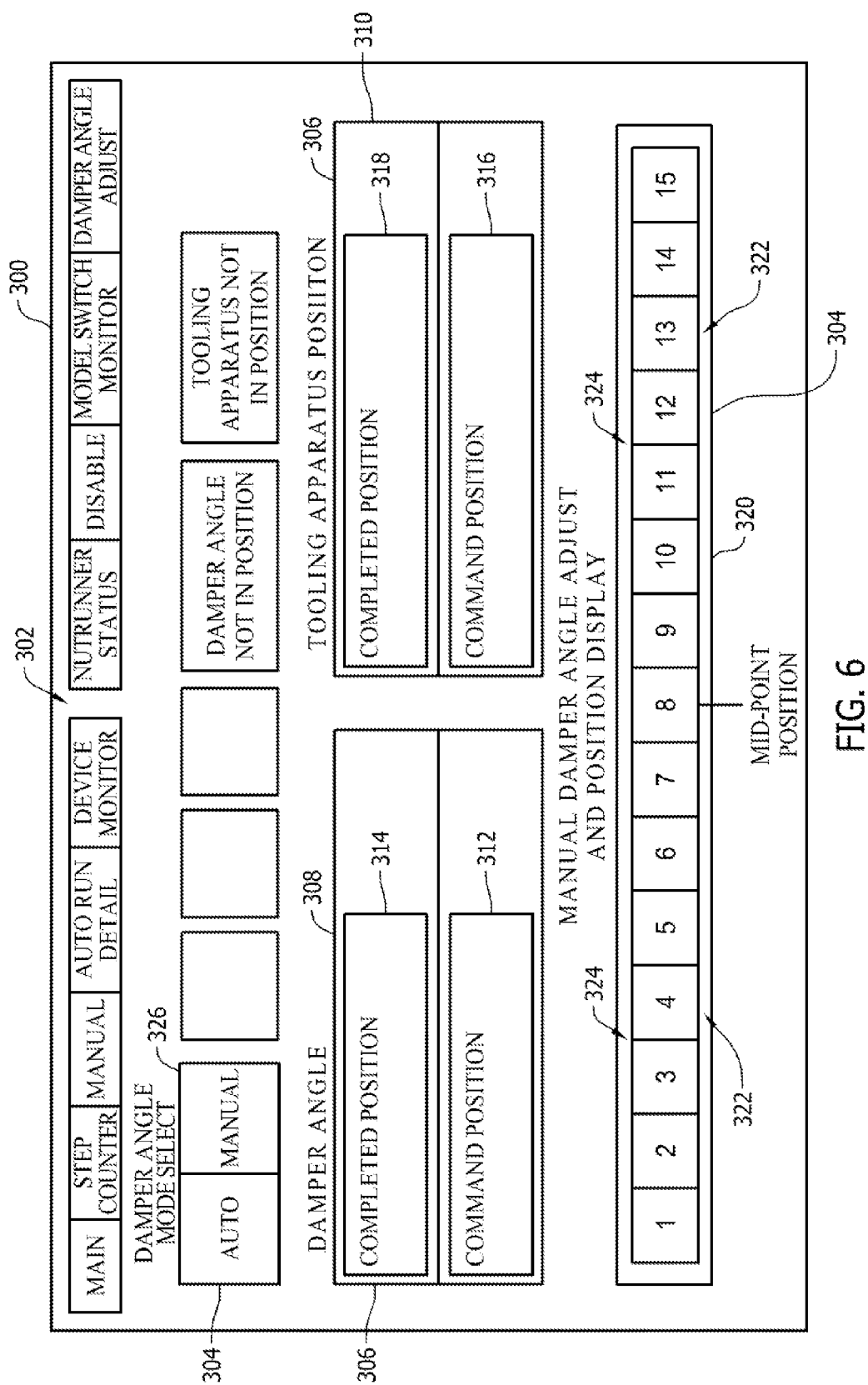
FIG. 6 is an exemplary graphical interface that may be used with the method shown in FIG. 5.

FIG. 5 is a flow chart of an exemplary method 200 that may be used in assembling vehicle 10 (shown in FIG. 1). FIG. 6 is an exemplary graphical interface 300 that may be used in assembling vehicle 10. In the exemplary embodiment, graphical interface 300 is presented by assembly management system 104 (e.g. via display 144) and may receive input (e.g., selections and/or entries) via user interface 146 (shown in FIG. 2). In one embodiment, one or more of the selections described herein are received via web server 180.

In the exemplary embodiment, method 200 includes receiving 202, by machine 84, a request to assemble component assembly 96, and transmitting 204, to facility control system 152, an authentication request including a unique vehicle identifier. A verification notification including a verified unique vehicle identifier that is associated with component assembly 96 is received 206 from facility control system 152, and a design orientation of second component 100 with respect to first component 98 is determined 208 based at least in part on the received verified unique vehicle identifier. Second component 100 is coupled 210 to first component such that the orientation of second component 100 with respect to first component 98 is substantially similar to the determined component design orientation.

In addition, method 200 includes determining 212 a vehicle characteristic associated with unique vehicle identifier 150, and determining 214 the second component design orientation based at least in part on the determined vehicle characteristic. Moreover, method 200 includes adjusting 216 an orientation of machine 84 with respect to component assembly 96 based at least in part on the determined vehicle characteristic.

In one embodiment, method 200 includes determining 218 a tire characteristic associated with the unique vehicle identifier, determining 220 a design damper angle based at least in part on the determined tire characteristic, and coupling 222 damper 52 to wheel assembly 50 such that damper 52 is oriented at a damper angle that is approximately equal to the determined design damper angle. In another embodiment, method 200 includes determining 224 a first damper angle associated with first damper assembly 46, and determining 226 a second damper angle associated with second damper assembly 48.

In the exemplary embodiment, assembly management system 104 presents graphical interface 300 with a data display 302 and a plurality of selectors 304. In the exemplary embodiment, data display 302 includes a plurality of data sections 306 that display information indicative of an operating status of component tooling apparatus 102. More specifically, data display 302 includes a damper angle display 308 and a tooling apparatus display 310. Damper angle display 308 presents a command position 312 that is indicative of the determined damper angle associated with vehicle 10. Damper angle display 308 also presents a completed position 314 that is indicative of an assembled damper angle. Tooling apparatus display 310 presents a command position 316 indicative of the determined apparatus position along the X-axis based at least in part on the determined support member length 68. In addition, tooling apparatus display 310 presents a completed position 318 that is indicative of the sensed position of positioning assembly 122 with respect to damper assembly 24 along the X-axis.

In the exemplary embodiment, graphical interface 300 also includes a damper angle adjust selector 320 that is configured to receive a user selection input, and to present a plurality of predefined damper angles 322, and a plurality of predefined positioning device positions 324 to enable a user to operate positioning assembly 122 to a selected damper angle and/or a selected device position. In addition, graphical interface 300 includes a damper angle mode selector 326 that is configured to receive a user selection input to enable machine 84 to be operated in an automatic mode or a manual mode. In the automatic mode, component management device 134 determines the damper angle and/or a position of positioning assembly 122 associated with the verified unique vehicle identifier, and operates positioning assembly 122 based on the determined angle and/or device position. In manual mode, a user selects a predefined damper angle and/or predefined device position via damper angle adjust selector 320.

The above-described systems and methods overcome at least some disadvantages of known vehicle manufacturing processes by providing a machine that can assemble a plurality of component assemblies that each include a plurality of component orientations. More specifically, the embodiments described herein include a component tooling apparatus that can assemble a damper assembly that includes a wheel assembly and a damper, and that selectively adjusts an orientation of the damper with respect to the wheel assembly to adjust a damper angle of the damper assembly. In addition, a control system coupled to the component tooling apparatus determines a component orientation based at least in part on a plurality of vehicle characteristics, and based on a plurality of tire characteristics. By determining a component orientation based on various vehicle and/or tire characteristics, component assemblies with different types of component orientations can be continuously formed on the machine, without requiring the machine to be adjusted or reconfigured. In addition, by assembling component assemblies with various component orientations, a cross camber value of a vehicle may be adjusted during assembly of the vehicle, thus reducing the cost of manually adjusting the cross camber value after production of the vehicle.

Exemplary embodiments of a machine for assembling vehicles and methods of assembling vehicles are described above in detail. The machine, and methods are not limited to the specific embodiments described herein, but rather, components of the machine and/or steps of the method may be utilized independently and separately from other components and/or steps described herein. For example, the machine may also be used in combination with other manufacturing systems and methods, and is not limited to practice with only the machine as described herein. Rather, an exemplary embodiment can be implemented and utilized in connection with many other vehicle assembly system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A machine for use in assembling a vehicle that includes at least a first component and a second component adapted to be coupled to the first component to form a component assembly, said machine comprising:
at least one component tooling apparatus configured to selectively adjust an orientation of the second component with respect to the first component; and a control system coupled to said at least one component tooling apparatus, said control system comprising a processor configured to:
  receive a unique vehicle identifier associated with the component assembly;
  determine a design orientation of the second component with respect to the first component based at least in part on the received unique vehicle identifier; and
  cause the component tooling apparatus to mechanically couple the second component to the first component such that the orientation of the second component with respect to the first component is substantially similar to the determined second component design orientation.

2. A machine in accordance with claim 1, wherein said processor is further configured to:
  receive a request to assemble a component assembly;
  transmit, to a facility control system, a vehicle verification request including a unique vehicle identifier;
  receive a verification message including a verified unique vehicle identifier; and
  determine the component design orientation based at least in part on the verified unique vehicle identifier.

3. A machine in accordance with claim 1, wherein said processor is further configured to:
  determine a vehicle characteristic associated with a unique vehicle identifier; and
  determine the component design orientation based at least in part on the determined vehicle characteristic.

4. A machine in accordance with claim 3, wherein said processor is further configured to adjust an orientation of said at least one component tooling apparatus with respect to the component assembly based at least in part on the received vehicle characteristic.

5. A machine in accordance with claim 3, wherein the first component includes a wheel assembly and the second component includes a damper adapted to be coupled to the wheel assembly such that a damper angle is defined between the damper and the wheel assembly, said processor is configured to:
  determine a tire characteristic associated with the unique vehicle identifier;
  determine a design damper angle associated with the determined tire characteristic; and
  couple the damper to the wheel assembly such that the damper is oriented at a damper angle that is approximately equal to the design damper angle.

6. A machine in accordance with claim 5, wherein the vehicle includes a first damper assembly and a second damper assembly, said machine further comprises a first tooling apparatus configured to adjust an orientation of the first damper assembly, and a second tooling apparatus configured to adjust an orientation of the second damper assembly, said processor is further configured to determine a first damper angle associated with the first damper assembly, and determine a second damper angle associated with the second damper assembly.

7. An assembly management system for use in assembling a vehicle that includes at least a first component and a second component adapted to be coupled to the first component to form a component assembly, said assembly management system comprising:
  a component management device coupled with at least one component tooling apparatus that is configured to selectively adjust an orientation of the second component with respect to the first component, said component management device configured to:
    receive a unique vehicle identifier associated with the component assembly;
    determine a design orientation of the second component with respect to the first component based at least in part on the received unique vehicle identifier; and
    cause the component tooling apparatus to mechanically couple the second component to the first component such that the orientation of the second component with respect to the first component is substantially similar to the determined second component orientation.

8. An assembly management system in accordance with claim 7, wherein said component management device is further configured to:
  receive a request to assemble the component assembly;
  transmit, to a facility control system, a vehicle verification request including a unique vehicle identifier;
  receive, from the facility control system, a verification message including a verified unique vehicle identifier; and
  determine the second component design orientation based at least in part on the verified unique vehicle identifier.

9. An assembly management system in accordance with claim 7, further comprising a vehicle registry device including a collection of vehicle identifiers associated with a collection of vehicle characteristics, said vehicle registry configured to:
  receive, from the component management device, a vehicle characteristics request including the unique vehicle identifier; and
  transmit, to the component management device, vehicle characteristics associated with the unique vehicle identifier.

10. An assembly management system in accordance with claim 9, wherein said component management device is configured to adjust a position of the component tooling apparatus with respect to the component assembly based at least in part on the received vehicle characteristics.

11. An assembly management system in accordance with claim 9, wherein said component management device is configured to determine the second component design orientation based at least in part on the received vehicle characteristics.

12. An assembly management system in accordance with claim 9, wherein the first component includes a wheel assembly and the second component includes a damper adapted to be coupled to the wheel assembly such that a damper angle is defined between the damper and the wheel assembly, said assembly management system comprising a tire registry device including a collection of vehicle identifiers associated with a collection of tire characteristics, said tire registry configured to:
  receive, from the component management device, a tire characteristics request including the unique vehicle identifier; and
  transmit, to the component management device, tire characteristics associated with the unique vehicle identifier.

13. An assembly management system in accordance with claim 12, wherein said component management device is configured to:
  determine a design damper angle based at least in part on the received tire characteristics; and
  couple the damper to the wheel assembly such that the damper is oriented at a damper angle that is approximately equal to the determined design damper angle.

14. An assembly management system in accordance with claim 12, wherein the vehicle includes a first damper assembly and a second damper assembly, said component management device coupled to a first tooling apparatus for assembling the first damper assembly, and a second tooling apparatus for assembling the second damper assembly, said component management device configured to determine a first damper angle associated with the first damper assembly, and determine a second damper angle associated with the second damper assembly.

15. A method of assembling a vehicle, said method comprising:
   receiving, by an assembly machine, a request to assemble a component assembly, the component assembly including at least a first component and a second component adapted to be coupled to the first component;
   receiving a unique vehicle identifier associated with the component assembly;
   determining a design orientation of the second component with respect to the first component based at least in part on the received unique vehicle identifier; and
   mechanically coupling the second component to the first component such that the orientation of the second component with respect to the first component is substantially similar to the determined component design orientation.

16. A method in accordance with claim 15, further comprising:
   transmitting, from the assembly machine to a facility control system, a vehicle verification request including a unique vehicle identifier;
   receiving, from the facility control system, a verification message including a verified unique vehicle identifier; and
   determining the second component design orientation based at least in part on the verified unique vehicle identifier.

17. A method in accordance with claim 15, further comprising:
   determining a vehicle characteristic associated with the unique vehicle identifier; and
   determining the second component design orientation based at least in part on the determined vehicle characteristic.

18. A method in accordance with claim 17, further comprising adjusting an orientation of the assembly machine with respect to the component assembly based at least in part on the determined vehicle characteristic.

19. A method in accordance with claim 15, wherein the first component includes a wheel assembly and the second component includes a damper adapted to be coupled to the wheel assembly such that a damper angle is defined between the damper and the wheel assembly, said method comprising:
   determining a tire characteristic associated with the unique vehicle identifier;
   determining a design damper angle based at least in part on the determined tire characteristic; and
   coupling the damper to the wheel assembly such that the damper is oriented at a damper angle that is approximately equal to the design damper angle.

20. A method in accordance with claim 19, wherein the vehicle includes a first damper assembly and a second damper assembly, said method further comprises:
   determining a first damper angle associated with the first damper assembly; and
   determining a second damper angle associated with the second damper assembly.

* * * * *